United States Patent
Domsten et al.

(10) Patent No.: US 9,323,230 B2
(45) Date of Patent: Apr. 26, 2016

(54) SYSTEM FOR VERIFYING A COMMUNICATION DEVICE AND A SECURITY COMMUNICATION DEVICE

(75) Inventors: Rune Domsten, Brønshøj (DK); Finn Nielsen, Copenhagen S (DK); Nils Østbirk, Copenhagen Ø (DK)

(73) Assignee: COPY STOP SYSTEMS APS, Esbjerg (DK)

( * ) Notice: Subject to any disclaimer, the term of this patent is extended or adjusted under 35 U.S.C. 154(b) by 217 days.

(21) Appl. No.: 14/123,131

(22) PCT Filed: May 29, 2012

(86) PCT No.: PCT/EP2012/060063
§ 371 (c)(1),
(2), (4) Date: Nov. 29, 2013

(87) PCT Pub. No.: WO2012/163922
PCT Pub. Date: Dec. 6, 2012

(65) Prior Publication Data
US 2014/0091902 A1   Apr. 3, 2014

Related U.S. Application Data

(60) Provisional application No. 61/491,373, filed on May 31, 2011.

(51) Int. Cl.
G05B 1/01 (2006.01)
G06Q 10/08 (2012.01)
G06Q 50/00 (2012.01)

(52) U.S. Cl.
CPC *G05B 1/01* (2013.01); *G06Q 10/08* (2013.01); *G06Q 50/00* (2013.01); *H04M 2250/04* (2013.01)

(58) Field of Classification Search
None
See application file for complete search history.

(56) References Cited

U.S. PATENT DOCUMENTS 8,607,057 B2 * 12/2013 Nath ................. H04L 9/008
370/389
8,820,639 B2 * 9/2014 Haddock ............. G06K 19/16
235/375

(Continued)

FOREIGN PATENT DOCUMENTS

CN 101165701 A 4/2008
CN 101582123 A 11/2009

(Continued)

OTHER PUBLICATIONS

Mohd Faizal Mubarak et al: "Mutual Attestation Using TPM for Trusted RFID Protocol", Network Applications Protocols and Services (NETAPPS), 2010 Second International Conference on, IEEE, Piscataway, NJ, USA, Sep. 22, 2010, pp. 153-158, XP031801566.

(Continued)

*Primary Examiner* — Brian Miller
(74) *Attorney, Agent, or Firm* — Harness, Dickey & Pierce, P.L.C.

(57) ABSTRACT

A system for verifying a communication device, the system comprising at least a one communication device comprising a transmitter for performing communication, and a storage for holding first information, the first information comprising ID information of the communication device, at least a one security communication device comprising a transmitter for performing communication, and a storage for holding second information, the second information comprising ID information of the security communication device, a verification element, and a communication element for receiving the ID information from one or more of the communication devices and one or more of the security communication devices, transmitting the received ID information to the verification element, wherein the verification element is adapted to verify each of the one or more communication devices only if the received ID information of the pertaining communication device can be verified and the received ID information of at least one of the one or more security communication devices can be verified.

20 Claims, 1 Drawing Sheet

(56) References Cited

U.S. PATENT DOCUMENTS

| | | | | |
|---|---|---|---|---|
| 8,914,863 | B2* | 12/2014 | Prchal | H04W 4/026 705/42 |
| 2008/0069347 | A1 | 3/2008 | Brown et al. | |
| 2009/0273451 | A1 | 11/2009 | Soppera et al. | |
| 2010/0127830 | A1* | 5/2010 | Nielsen | G06K 19/0723 340/10.1 |
| 2010/0223214 | A1* | 9/2010 | Kirpal | G06F 17/30917 706/12 |
| 2012/0256732 | A1* | 10/2012 | McAllister | B65C 9/1865 340/10.2 |
| 2014/0091902 | A1* | 4/2014 | Domsten | G06Q 10/08 340/5.8 |
| 2015/0002260 | A1* | 1/2015 | Brown | H04L 9/3252 340/5.8 |

FOREIGN PATENT DOCUMENTS

| | | | |
|---|---|---|---|
| CN | 101946453 A | 1/2011 | |
| WO | WO-2007113464 A1 | 10/2007 | |

OTHER PUBLICATIONS

Juels A Ed—Association for Computing Machinery: "Strengthening EPC Tags Against Cloning", Wise. Proceedings of the 2005 ACM Workshop on Wireless Security. Cologne, Germany, Sep. 2, 2005; [Proceedings of the ACM Workshop on Wireless Security], New York, NY : ACM, US, Sep. 2, 2005, pp. 67-75, XP001508054, DOI: 10.1145/1080793.1080805.

International Search Report PCT/ISA/210 for International Application No. PCT/EP2012/060063 Dated Sep. 10, 2012.

International Preliminary Report on Patentability including annexes International Application No. PCT/EP2012/060063 dated Aug. 13, 2012.

Chinese Office Action dated Dec. 29, 2015 issued in corresponding Chinese Application No. 201280034842.8 (English translation).

* cited by examiner

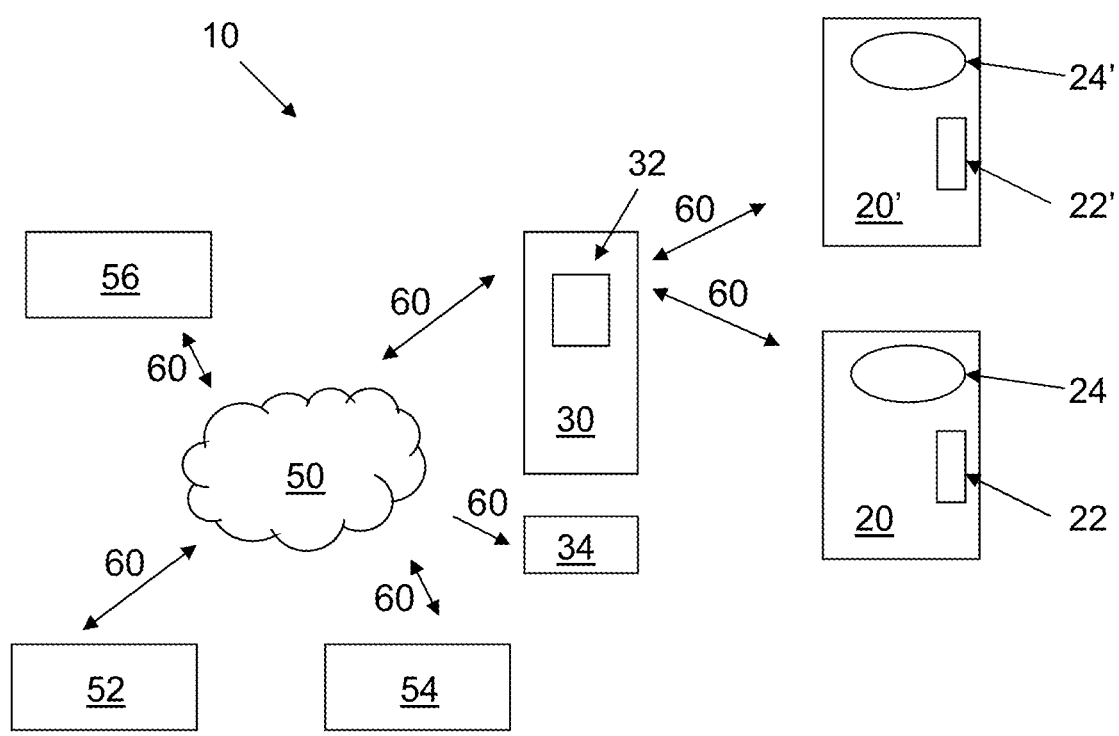

SYSTEM FOR VERIFYING A COMMUNICATION DEVICE AND A SECURITY COMMUNICATION DEVICE

CROSS-REFERENCE TO RELATED APPLICATIONS

This application is the national phase under 35 U.S.C. §371 of PCT International Application No. PCT/EP2012/060063 which has an International filing date of May 29, 2012, which claims priority to U.S. provisional patent application No. 61/491,373 filed May 31, 2011.

BACKGROUND OF THE INVENTION (1) Field of the Invention

The present invention relates to a system and a method for verifying a communication device and a security communication device and in particular a system and a method for verifying an RFID tag, and thus a product to which the tag is fixed, in the presence of a security RFID tag.

The invention relates to a system and a method for verifying a communication device, which may be used for verifying the genuineness of the communication device and/or a product to which the communication device is fastened.

(2) Description of Related Art

The battle against counterfeit goods is an ongoing battle which is fought on many fronts. One such front is the prevention of such goods from entering different markets. However, producers of counterfeit goods, such as sport shoes or bags, are getting very good at copying such goods, which makes it very difficult for an officer at e.g. a port to spot such counterfeits.

One manner of "marking" original goods is to provide built-in RFID-tags which may then be scanned and used for identifying the product. However, as the products can be copied or cloned, so can RFID tags. The present invention targets the problem of cloned tags.

The verification of a communication device is only made, if also the security communication device is verifiable. Thus, different types of copying or cloning of the communication devices or even the communication element may be prevented.

BRIEF SUMMARY OF THE INVENTION

In a first aspect, the invention relates to a system for verifying a communication device, the system comprising:
  at least a one communication device comprising:
    a transmitter for performing communication, and
    a storage for holding first information, the first information comprising ID information of the communication device,
  at least a one security communication device comprising:
    a transmitter for performing communication, and
    a storage for holding second information, the second information comprising ID information of the security communication device,
  a verification element, and
  a communication element for:
    receiving the ID information from one or more of the communication devices and one or more of the security communication devices,
    transmitting the received ID information to the verification element,
  wherein the verification element is adapted to verify each of the one or more communication devices only if the received ID information of the pertaining communication device can be verified and the received ID information of at least one of the one or more security communication devices can be verified.

In this context, a communication device may be any type of device comprising a storage and a transmitter for performing wireless communication. Typically, this device is an RFID tag, such as is known from access control in office buildings and product marking in warehouses, but also computers, PCs, media players, cell phones and the like have these capabilities and may thus be used as communication devices or security communication devices.

The communication may be one-way communication where the transmitter constantly, intermittently or simply when operated outputs the first information or at least the ID information. In more complex systems, the communication may be bi-directional so that new information may be transmitted to, and stored in, the communication device. Also, the communication device may be of a type having one or more memory locations "locked" by a password, where the contents of these memory locations may only be accessed/transmitted, when this password has been transmitted to the communication device which may then give access to the contents of these memory locations, such as facilitate or allow the transmission of such information and/or the storing of new information in those locations.

The communication may be wired (electrical or optical connection), wireless or optical where the communication element has means for providing an image of the communication device and/or security communication device. Preferably, wireless communication is used which can be performed over a distance without requiring line-of-sight.

The wireless transmitter may be adapted to perform any type of wireless transmission such as Bluetooth® communication, Wireless LAN, RF communication, RFID, UHFRID, UHFRFID, LFRFID, inductive communication, NFC, radio transmission (radio waves), optical transmission (optical wavelengths, visible, UV, IR, NIR or the like), WLAN communication or the like.

The advantage of using wireless transmission and/or communication is that the communication may be carried out with communication devices provided in e.g. boxes or the like without having to open these boxes. It is noted that the communication devices may then be attached to, such as provided inside, products, the verification of which may be linked to the verification of the communication device.

Thus, the communication devices preferably are self powered either by an internal power supply or by being able to receive or derive power from the surroundings, such as from an interrogation signal provided to the communication devices. The latter is usual for simple RFID tags used for e.g. product identification/tracking.

The storage may be any type of storage for information, such as a RAM, ROM, PROM, EPROM, EEPROM, Flash, tape, card, hard disc or the like. Preferably, the storage is small both in weight, size and/or power requirements so as to be cheap and incorporable into a small device.

The ID information may be a simple number (as a MAC or IP address) or a more elaborate type of data, such as an address, name, brand or the like, as well as combinations thereof. Preferably, the ID information of all of a number of communication devices are different.

The first information may be only the ID information, or the first information comprises additional information, such as information relating to an identification of the verification element, in the situation where multiple verification elements exist, or information which may e.g. be used for visually verifying a brand, colour, model, type or the like of product. This information may be provided to or on a display of the communication element for a user to visually verify also this information.

At least one security communication device is provided. This security communication device also has a transmitter and a storage which in principle may be the same or identical to those of the communication device. However, for reasons which will be elaborated on further below, it is preferred that the security communication device has more capabilities, such as to be able to store more data and perform encryption/decryption, than the communication devices which are usually more simple and have fewer capabilities. The more capabilities, such as the incorporation of a processor for encryption/decryption, the harder is it to copy the communication device.

As is the situation with the first information, the second information may also comprise additional information, such as an identity of a verification unit or a part thereof which may be used for verifying the security communication device. Other information may be information relating to a version or the like of information of the security communication device in particular, as will be described further below, in the situation where this information is dynamic.

A verification element is used for verifying the communication device(s) from which ID information and potentially additional information, has been received. This verification may be performed in a number of manners. In one situation, the verification may be based on a comparison between the received ID information or other information from the communication device and a list of corresponding acceptable or verifiable communication devices or information representing these devices. In order to more easily reveal a copied or cloned communication device, the verification element may have allocated one number for each communication device, the numbers for different communication devices being different and taking up only a percentage (1%, 2%, 3%, 5%, 10%, 15%, 20%, 25%, 30% or the like) of the numbers of a number interval. Thus, a direct copying of a communication device will result in multiple communication devices with the same number, which may be detected by multiple scans of the same number either at the same time or closely spaced in time but not in space. In this respect, a scanning is the wireless communication with the communication device.

If, however, a direct copying/cloning is refrained from, a copyist may attempt to clone a communication device by providing other communication devices with different numbers. However, when only a percentage of the available numbers are in use (and when this knowledge is not public), the copyist is not able to predict which numbers to use. The scanning of a single communication device with a number not verifiable will point to the fact that the communication device is a clone.

Other manners of verification comprise bi-directional communication with the communication device and/or the security communication device.

The verification of the communication device(s) and the security communication device(s) may differ.

In the present context, the communication device comprises means for receiving the ID information. This receiver may be adapted to any type of wireless communication, as is described further above. Usually, the receiver has an antenna or other signal receiver, such as a photosensor, a diode or the like. Also, a receiver may comprise means for generating a signal, typically an electrical signal, received by or generated by an antenna/receiver of the receiver. In addition, the receiver may comprise means for also analyzing a received signal and reacting to the signal. In a preferred embodiment, the communication device is a so-called RFID tag which is adapted to perform RFID communication. Usual RFID tags comprise, as part of the receiver/transmitter thereof, an antenna adapted to receive a signal and potentially derive power there from to power the remaining part of the communication. Thus, the present receiver may be adapted to output a signal from which power may be derived.

In a preferred embodiment, the communication element is a scanner, such as an RFID scanner, which is portable and which collects the information from a plurality of communication devices. This communication element may then be in wireless (or via wires) communication (wired LAN, wireless LAN, RF communication, satellite communication, Bluetooth® communication, optical communication, radio communication or the like) with the verification elements, such as via the Internet or a local transceiver which then is in connection with the Internet.

Thus the communication element also comprises a transmitter for transmitting the ID information to the verification element. Naturally, also this communication may be any type of wireless communication, such as Bluetooth® communication, Wireless LAN, RF communication, optical communication, radio communication, or the like. However, this may also be performed using wires or optical cables, such as via a network, LAN, WAN, the internet or the like.

Thus, the communication device may be or may comprise any type of transmitter. Usually, the transmitter has an antenna or other signal emitter, such as a laser diode or an LED, OLED, AMOLED or the like. Also, or alternatively, a transmitter may comprise means, such as a NIC, for providing a signal, typically an electrical signal, to an antenna/emitter of the transmitter. In addition, a transmitter may additionally comprise means, which will be described further below, for also receiving a signal, analyzing this signal and reacting to the signal.

When the verification element is adapted to verify each of the one or more communication devices only if the received ID information of the pertaining communication device can be verified and the received ID information of at least one of the one or more security communication devices can be verified, an increased certainty is obtained that the communication device is genuine. As will be described below, the security communication device may be of a more secure type or may be issued to trusted parties or fixed to positions or elements which then are required to be present in the vicinity of the communication device to also be scanned or be communicated with so as to transmit its ID information and thus take part in the validation.

In general, a result of the validation or verification may be returned to the communication element or communication device. Thus, the communication between the verification element and the communication element and/or communication device may be two-way. However, a threat has been realized in compromised communication elements. An example is the use of a scanner which always acknowledges the verification of all scanned communication devices without forwarding the ID information to the verification element or by ignoring the verification result.

Thus, it is preferred that the system further comprises an information providing element in the vicinity of the communication element adapted to receive information from the verification element, such as the second information, and provide this to a user. In addition, or alternatively, the communication element may receive such information, or the user may, via the communication element, access e.g. an internet home page from which verification information may be derived.

This information providing element may be a telefax or Internet browser present in an office of an operator of the communication element, or colleagues thereof. A result of the verification may then be forwarded as a telefax or be available over the Internet from that office. Alternatively, the information providing element may be a telephone (cell phone, satellite phone) over which a text message, SMS, MMS, or the like may be forwarded, or an Internet page or other application may be fed with information describing to the operator whether non-verifiable communication devices have been scanned.

In this relation, "in the vicinity" primarily relates to the fact that the result of the verification preferably reaches the operator or the operator's colleagues sufficiently swiftly for the operator to prevent further shipping or transport of the non-verifiable communication devices and any products to which they are fixed.

As mentioned above, the system preferably comprises a plurality of communication devices where at least two communication devices have different verification information identifying different verification elements.

In a preferred situation, the communication with the communication devices is of a type allowing simultaneous communication with a plurality of such devices. The same may be the situation with the security communication devices. In this situation, "simultaneous" may mean that multiple communication devices simultaneously output their information where the communication element then either receives such signals simultaneously or serially/sequentially.

Naturally, the verification element may be a single entity, such as a server, a PC, a network element or the like. However, the verification element may also be a plurality of entities which interrelate, communicate, exchange information or the like. In this situation, one such entity may obtain verification information, such as information useful for verifying a communication device and/or security communication device, from another entity and then perform the actual validation.

The verification element may be identified in a number of manners, such as from information derived from a communication device or security communication device. One such manner may be from an Internet address, an IP address (such as IPv4 or IPv6), MAC address, URL or any other type of information adapted to target or single out a unit, such as a server, a network, a host, or the like, or a process or software running on one of these. Alternatively, the information may be a telephone number, an address, a brand name, a logo, a product identification, a product name, a bar code, or simply a number or other information which may, such as from a look-up table, be used for identifying the verification element from e.g. a plurality of verification elements.

In one embodiment, the verification element comprises a first and a second verification unit wherein:
  the first verification unit comprises security verification information relating to ID information of verifiable or verified security communication devices, the first verification unit being adapted to output at least part of the verification information to the second verification unit, and
  the second verification unit comprises information relating to ID information of verifiable or verified communication devices, the second verification unit being adapted to:
    receive the at least part of the verification information,
    receive the ID information from the communication element,
    compare the received security ID information to the at least part of the verification information and the received ID information to the information and output, on the basis of the comparison, information relating to whether the communication device is verified or not.

Naturally, the receiving and outputting means may be any suitable means for performing data exchange. This may be over a wireless or a wired connection and may comprise any receiving and/or transmitting means used today, such as optical communication, radio communication, wired communication (LAN, Internet, TCP/IP, UDP or any other protocol). Naturally, a combination of different types of communication (e.g. wired and wireless communication) may be used.

The comparison may, e.g., be performed in a processor (software programmable or hardwired), such as an Intel® processor, an ASIC, an FPGA or the like.

Usually, the verification units would be separate computers (servers, PCs or the like) and have all usual elements and peripherals thereof. Naturally, however, the same entity or server may be adapted to verify both communication devices and security communication devices. In one situation, a brand owner may, in this own factory or facility wish to control or check the flow of products by adding the communication devices to products and security communication devices to supervising personnel or at outlets/packeting facilities, where such personnel or facilities are provided with security communication devices verified by the brand owners server together with the communication devices of the products.

In this embodiment, the verification information for verifying the security communication device is provided by the first verification unit. In one embodiment, different second verification units are provided for verifying different communication devices or different groups of communication devices. Then, only a single first verification unit may be provided for transmitting to the second verification units the verification information.

Naturally, the reverse situation may be seen where the verification information output by the first unit relates to the verification of the communication device and the information held by the second verification unit is for use in verifying the security communication device.

The ID information may, as is described above, be a simple number, but a more elaborate scheme is preferred at least for the security communication devices which may be adapted to perform encryption/decryption of data in order to be able to perform an encrypted communication with the verification element. This may be performed on the basis of asymmetric or symmetric passwords. Then, the communication device may correspond with the verification element over an encrypted protocol, where the communication element may be transparent in the sense that it is not able to derive information from the communication.

In fact, in order to e.g. prevent cloning of the verification element or the security communication device and/or communication device, it may be desired that the encryption key may be generated from a combination of data stored in the (security) communication device and data available to, such as stored in, the verification element.

Then, this key can only be generated with access to both the verification element and the (security) communication device. A simple manner would be to combine, using a simple mathematical operation (and, or, XOR, addition, subtraction, multiplication or the like) the data of the verification element and the (security) communication device. A more elaborate technique is described with reference to the drawing.

In general, or in the above embodiment, it may further be desired that at least one of the security communication devices is adapted to receive and store new security ID information. In this manner, the security ID information may be dynamic, which makes cloning of the security communication element even more difficult.

When the verification element comprises at least the first and second verification units, this dynamic behaviour may be implemented by:
- the first verification unit is preferably adapted to output to the second verification unit new security ID information, and,
- the second verification unit is then adapted to output the new security ID information to the one of the security communication devices and, but only optionally, store the new security ID information.

Thus, next time this security communication device outputs its security ID information, this may differ from the information output the last time. Thus, a cloned or copied security communication device may be identified.

Having the information stored in the second unit will make the verification swifter. Alternatively, or if the information is too old, new information may again be requested at the first unit.

It may, be preferred that:
- the security ID information and the new security ID information of the pertaining security communication device both comprises a first part and a second part, the first part of the security ID information and the first part of the new security ID information being identical, such as relating to an ID of the security device, and the second part of the security ID information and the second part of the new security ID information being different, such as a counter or version number,
- the second verification unit is adapted to compare, when having received the security ID information from the one of the security communication devices, the second part of the received security ID information with a corresponding part of the received at least part of the verification information and, if no correspondence is determined, request, prior to the comparing step, updated verification information from the first verification unit.

Alternatively, the first parts may be independent of each other. The second part relates to e.g. versions of the first parts and, if not identical in the security ID information and the verification information, different versions may exist, and the verification information may need to be updated to obtain the right version. It is noted that the security communication device may also have an older version of the security ID information, whereby the verification information may store a number of versions of this information in order to be able to verify the security communication device.

In this manner, the first part may be used for actually identifying the security communication device (and this part may thus differ from security communication device to security communication device), whereas the second part may be used for indicating a version or the like. Then, it may be desired that the first and/or second verification unit stores both the newest second part as well as the former second part for the situation where the writing of this new second part failed. Thus, the security communication device may be verified/acknowledged even if it has the former or older version of the security ID information.

In another embodiment, the communication element will forward the ID information from the security communication device to both the first and the second verification unit. The first unit will verify the security communication device. The second verification will also receive the ID information from the communication device and, if verifiable, will forward to the first unit the ID information from the security communication device and request whether the security communication device is verifiable. If so, the second unit will respond with a verification of the communication device and, indirectly, the security communication device.

It may be preferred, when the verification element comprises the first and second units, that the first verification unit is adapted to compare an identity of the second verification unit to a list of recognized second verification units and output the at least part of the verification information only if the second verification unit is represented on the list.

In this manner, cloning or copying of the second unit is not possible in that no verification information is output but to the correct second units. The identification of the correct second units may be performed in a number of manners, such as using the ID types described further above for verification units.

In a particular set-up, the second units belong to different brand owners (such as Nike®, Adidas® and the like). Each brand owner issues his own communication devices and handles the verification thereof.

The security communication devices are issued by e.g. a centralized authority winch also comprises the verification information required to verify these. This will be the first verification unit.

When a number of communication devices are scanned, some of these may belong to one brand owner and some to the other. The ID information relating to one brand owner is sent to his server together with the security ID information for the one or more security communication devices scanned. The brand owner server will then request verification information from the first verification unit relating to the scanned security communication device. If the brand owner server is on the list, which may be maintained by the same centralized authority, or any other authority, the information is transmitted to allow the brand owner server to verify both the security communication device as well as the communication devices belonging to the brand owner. The other brand owner may do exactly the same for the communication devices issued by him.

In the situation where version numbers are used for the security ID information, it is clear that when one brand owner server has verified a security communication device this server may also have the new version of the verification information so as to be able to verify the security communication device also the next time. However, the other brand owner server will have an older version and will then have to request updated verification information in order to be able to verify the security communication device and then the communication device(s).

Naturally, also different security communication devices may be present which require verification on the basis of data from different first units. This, however, may be performed in the same manner, where the second unit may then, such as from the security ID information, know where to request the verification information.

Instead of controlling the access of the second units to the verification information using the version numbering, the verification information provided to a second unit may be valid only for a certain period of time so that it is ensured that the second unit cannot verify a security communication device for more than that period of time without being itself verified (by transmission of the verification information) by the first unit. Thus, even if the second unit is cloned in its entirety, it will only be functional for this period of time, as its verification information will there after be outdated.

In one embodiment, a security communication device may be attached to and issued to the communication element, a container or other enclosure in which the communication elements are transported or stored. Alternatively or in addition security communication devices may be issued to trusted positions/rooms and/or personnel in which communication devices are communicated with together with such security communication devices. Thus, from the ID information received, additional information is received as to where the communication takes place (security communication devices issued to and present in particular positions/rooms) and/or who is present (security communication devices issued to persons present).

Thus, from the presence of a security communication device, the system may acknowledge or verify the communication device as the scanning or communication is performed in or in the presence of the correct container/enclosure, in or at an approved site or in the presence of an approved individual. Naturally, a combination of such security communication devices may exist.

Another aspect of the invention relates to a method of verifying a communication device, the method comprising the steps of:
- at least a one communication device transmitting ID information of the communication device,
- at least a one security communication device transmitting security ID information of the security communication device,
- a communication element receiving the ID information from one or more of the communication devices and the security ID information from one or more of the security communication devices, and transmitting the received ID information and security ID information to a verification element,
- the verification element verifying each of the one or more communication devices only if the received ID information of the pertaining communication device can be verified and the received security ID information of at least one of the one or more security communication devices can be verified.

As mentioned above, the wireless communication may be any type of known communication, such as Bluetooth®, WLAN, radio communication, optical communication or the like. The communication device and the security communication device may use the same or different types of communication/protocols.

The communication element may communicate with the verification element using wired or wireless communication. Again, the protocol used is not important in this connection.

The verification element may be a single unit, such as a computer/PC or the like or may be formed by a number of such units which are able to exchange information.

In one situation, the method further comprises the steps of, pursuant to the verification step:
- transmitting new security ID information to the security communication device and storing the new security ID information in the security communication device.

In this manner, the above dynamic behaviour is obtained whereby even copying of a security communication device may be revealed.

In general, as is also described further above, the verification element preferably comprises a first and a second verification unit wherein:
- the first verification unit holds verification information for verifying security communication devices and outputs at least part of the verification information to the second verification unit, and
- the second verification unit:
  - holds information for verifying communication devices,
  - receives the at least part of the verification information,
  - receives the ID information from the communication element,
  - receives the security ID information from the security communication element and
  - compares the received security ID information to the at least part of the verification information and the received ID information to the information and outputs, on the basis of the comparison, information relating to whether the communication device is verified or not.

The above considerations relating to the use of the two units and the interplay there between are equally valid here.

Preferably, the method then further comprises the dynamic behaviour, such as when:
- the first verification unit outputs to the second verification unit new security ID information,
- the second verification unit stores the new security ID information and outputs the new security ID information to the one of the security communication devices.

Then, preferably:
- the security ID information and the new security ID information both comprises a first part and a second part, the first part of the security ID information and the first part of the new security ID information being identical, and the second part of the security ID information and the second part of the new security ID information being different,
- the second verification unit comparing, when having received the security ID information from the one of the security communication devices, the second part of the received security ID information with a corresponding part of the verification information and, if no correspondence is determined, requesting, prior to the comparing step, updated verification information from the first verification unit.

Thus, the second part may be an indication of a version or at least illustrate whether the information held by the second unit is still valid, or if updated information is required from the first unit.

Also, as is described further above, the step of the first verification unit outputting the verification information may comprise the first verification unit comparing an identity of the second verification unit to a list of recognized second verification units and outputting the verification information only if the second verification unit is represented on the list Additionally, multiple first verification units may be present, where the second verification units communicate with these also only if the first verification units are represented on the list.

BRIEF DESCRIPTION OF THE SEVERAL VIEWS OF THE DRAWING(S)

In the following, preferred embodiments of the invention are described with reference to the drawing wherein:

FIG. 1 illustrates a preferred embodiment of the system according to the invention.

DETAILED DESCRIPTION OF THE INVENTION

In FIG. 1, a system 10 is illustrated. In this embodiment, RF communication 60 is used between an RFID tag 20 and a transceiver 30. The RFID tag 20 has an antenna 24 and a controller having therein a storage for holding information for transmission to the transceiver 30 via the antenna 24.

Generally, the present system 10 may be used at e.g. a port, airport or other border crossing, where goods is to pass a border and thus should be checked for e.g. genuineness. The transceiver may then be portable, such as a hand-held scanner, which is used for inspecting parcels, containers or the like, and which is used for communicating with tags 20 embedded in or fastened to goods, the genuineness of which the tags vouch for.

Thus, a customs officer may point the scanner 30 toward the product, or a number of products, where after information relating to the scanned tags 20 is obtained.

The transceiver 30 performs usual RFID communication with the tag 20. Also, the transceiver is connected to (communication 60) the Internet 50 and there through to (communication 60) one or more servers 52, 54 and 56.

In the storage in the controller 22, information relating to both an ID of the tag 20 is stored as well as information identifying one of the servers 52, 54 and 56 which, from the ID number and/or other information of the tag 20, is able to verify the validity or genuineness of the tag 20. Naturally, a single server may be used, whereby the identifying information may be left out.

This system may be used for verifying the genuineness of products in which the tags 20 are provided, or to which the tags 20 are fastened.

However, in order to be able to allow different manufacturers or brand owners to verify their own products or tags 20, it has been found desirable to have such tags 20 themselves comprise the information identifying the manufacturer's or brand owner's server 52/54/56 which is able to perform the verification.

Thus, when the transceiver communicates with the tag 20, the ID information and the brand owner ID information are transmitted from the tag 20 to the transceiver 30 which then, from the brand owner ID information, identifies the server 52/54/56 to which the ID information is to be transmitted.

Having received the ID information, the applicable server 52/54/56 may then revert to the transceiver 30 with information relating to the validity or genuineness of the tag 20 or a product to which the tag 20 is fastened. In one situation, a brand owner has a very large number of possible IDs but only uses a percentage. Thus, if an ID not actually used is scanned, the brand owner will know that the pertaining tag 20—and possibly a product attached thereto—is a fake. Also, if the same ID is scanned twice, where the verification information of the server is the same, a copy tag 20 may exist. The same may be the situation, if the same ID is scanned twice with a large distance between the scanning places.

Naturally, a wide variety of possibilities are available in a system 10 of this type.

In one situation, the information exchanged between the transceiver 30 and the tag 20 may be encrypted or otherwise difficult to decipher and copy. In one situation, additional data is present in the controller 22 which is used for encrypting the ID information and/or the verification information before transmission to the transceiver 30. This encryption may be dynamic, so that transmitting the same basic information twice will actually mean transmitting different signals to the transceiver 30. Different encryption keys may be used, and new encryption keys may be transmitted to the tag 20 when communicating with the transceiver 30.

This is described in more detail in the Applicant's co-pending application filed on even date and with the title: "A SYSTEM AND A METHOD FOR VERIFYING A COMMUNICATION DEVICE".

In order to ensure that the transceiver 30 is not compromised and/or that the scanning/communication is performed in a secure environment, a security tag 20' is scanned. This tag 20' is a security tag which may be issued to the particular transceiver 30, the person performing the scanning, supervisor supervising the scanning, and/or a position of the transceiver 30. The transceiver is of a type adapted to perform simultaneous or almost simultaneous communication 60 with a plurality of tags 20/20', whereby the transceiver 30 receives information from a plurality of tags 20/20'.

In order to verify the circumstances of the scanning, firstly the security tag 20' is verified. This is obtained by communicating with a security tag server 56 which comprises information useful for verifying the genuineness of the security tag 20'.

In order to ensure that the contents of the security tag 20' are not tampered with and that the tag 20' is genuine, a security protocol is used wherein, firstly, the contents of the tag 20' are encrypted and thus difficult to derive.

Secondly, the communication between the server 56 and the tag 20' is encrypted using e.g. a dynamic encryption wherein part of the encryption key may be derived from information present in the tag 20' and part thereof from information present in the server 56.

The tag 20' may hold a series of data (bits, bytes, words or the like) each stored at different positions or addresses in a storage of the tag 20' or the processor 24'. The server 56 also comprises a series of data (bits, bytes, words or the like) each stored at different positions or addresses in a storage of the server 56. The tag 20' holds one or more pointers or addresses to data in the server 56, and the server 56 holds one or more pointers or addresses to data in the tag 20'. The encryption key is generated from the data, in the server 56, at the pointer(s)/address(es) stored in the tag 20' as well as the data, in the tag 20' at the pointer(s)/address(es) stored in the server 56. Thus, all relevant data cannot be derived from the tag 20' alone nor from the server 56 alone.

Verification of the tag 20' may be performed by the transceiver 30 forwarding data, such as an ID of the tag 20' as well as the pointer(s)/address(es) stored therein, to the server 56, which reverts with the pointer(s)/address(es) stored in the server 56 for that tag 20' as well as the data at the identified pointer(s)/address(es). The tag 20' then reverts with its data at those positions. Now both elements are able to calculate the encryption key, which may then be used for the communication.

Alternatively, only the positions may be exchanged, where the data at those positions may then be used for generating the key.

Naturally, new data may then be stored in the tag 20' in order to make this process dynamic.

The above embodiment describes the verification of the tag 20 by one server 52/54 and the tag 20' by another server 56.

The verification of the tag 20' may be made more efficient by providing, from the server 56 to the servers 52/54 the relevant information for verifying the tag 20'. Then, the servers 52/54 may perform the verification of both tags 20 and 20'.

In order to counteract cloning or leaking of information from the servers 52/54, the information fed from the server 56 may be time dependent or may be required renewed for each communication with a tag 20'. In this manner, a cloning of the server 52/54 will only be effective for a limited period of time.

In one situation, the server 52/54 may receive from the server 56 the information required to verify all tags 20'. In another embodiment, the data for only some of the tags 20' is stored in the server 52/54. When, as is described above, the verification of a tag 20' is dynamic, new data should be written to a tag 20' once verified. Thus, the server 52/54 may have the data required to verify the tag 20' but not the next data to be written to the tag 20'. Then, the actual verification may be rather swift, as the server 52/54 usually will have the required data, where after new data may be requested from the server 56 while performing other communication or actions at the tag 20' or the tags 20.

In order to handle the situation where the server 52 initially verifies a tag 20', where after the server 54 is to verify the tag 20', each verification of the tag 20' may be provided with a version number, so that the tag 20' initially and with the first information output, outputs the version number. If the data stored in the server 52/54 does not have the correct version, new data may be requested from the server 56. This also solves the problem of the step of writing new data to the tag 20' failing, whereby the tag 20' still has the former version of the data.

The simplest tag 20 may have only an ID, which may be read by the transceiver 30 and fed to the server 52/54. Multiple readings of the same ID at the same time or very close to each other in time but at different locations may then point to the fact that a clone may exist.

A more complex tag 20 may be of a type storing therein an ID and having additional storage areas for holding information, of which two areas are locked with a password stored in a first of the two areas and an instruction stored in the second of the two areas may be used for killing the tag 20 or rendering it in-operational. Then, the information of the two areas can only be read out or replaced upon feeding to the tag 20 the password. One storage area may be used for storing an address or other identification of the particular server 52/54 which can verify the tag 20. In this situation, the server 52/54 may store the password for each tag 20 and feed this to the tag 20 in order to retrieve the information of the second address and by this verify the genuineness of the tag 20.

An even more complex set-up may be that described above where the password, and even also the information of the second address, are not stored in the server 52/54 but can only be generated from information stored in both the server 52/54 and the tag 20.

In another situation, the server 52/54 may receive, from the tag 20, the information required to verify the tag 20. Also, the server 52/54 may receive, from the tag 20' information identifying this tag at this point in time. The kill password of the second address may be used. The server 52/54 may then request the server 56, which has the information required to verify the tag 20', whether this tag 20' is verifiable, and forwards this identifying information to identify the actual tag 20'. The server 56 then reverts to the server 52/54 with the verification information, and the server 52/54 may then revert with the overall information of whether the tag 20 and the tag 20' are verifiable.

Naturally, the tag 20 may alternatively be of a type adapted to perform encrypted communication and thus be able to encrypt and decrypt data—and thus to have a processing capability.

Preferably, the tag 20' is of a type having a certain processing capability. Also, the tag 20' preferably is adapted to store a number of different types of information, such as an ID of the tag 20', an address or other identification of the server 56 which may validate or verify the tag 20'. This address/identification may be used by a server 52/54 to obtain required information for validating/verifying the tag 20', if this is desired.

Preferably, the communication between the tag 20' and the server 52/54/56 is an encrypted communication performed on the basis of encryption keys stored in the tag 20' and in the server 52/54/56 as is described above.

Naturally, the transceiver 30 may be adapted to scan a plurality of tags 20/20'. Thus, any number of security tags 20' may be scanned. This adds another layer of security to the process in that security tags 20' may be issued to trusted personnel, trusted positions/places, or the like. Thus, a product tag 20 may be scanned with a tag 20' of a container in which the product of the product tag 20 is to be shipped. A security tag 20' may be issued to a particular scanning position within an airport at which a person also having a tag 20' works. Thus, a tag 20', even if verifiable on its own, may be accepted only if scanned also together with at least one other of a group of security tags 20' which are expected scanned together with the that tag 20'.

Naturally, it is desirable to receive the validity/verification/genuineness information from the server 52/54/56. This information may be transmitted back to the transceiver 30, which may then immediately inform an operator of the result.

However, if the transceiver 30 is compromised, it may simply be made to always state acceptance of all tags 20 without sending the information to the servers or by ignoring any invalidity answer there from.

Thus, in order to ensure that the transceiver 30 is not compromised, the validity/verification/genuineness information from the server 52/54/56 may, however, be transmitted not to the transceiver 30 but to a telefax, mail address, cell phone 34 or the like of or near an operator or an authority, the moral of which is without doubt. An alternative could be to provide information, on a website available to the operator or authority, such as via a computer 34, relating to the scanned tag(s) 20.

In addition, the server 52/54/56 may transmit additional information to the transceiver 30. This information may be information relating to the identity or type of product to which the tag 20 should be attached. Thus, a trademark, logo, description, brand name or the like may be transmitted to the transceiver 30, or fax/mail/computer/cell phone 34, for the operator to see and potentially compare with the product scanned.

Naturally, security tags 20' may be issued by the owner of one of the "normal" servers 52/54. This situation is seen when a brand owner wishes to control the goods manufactured at a manufacturing site. This could be performed using the tags 20' issued by or controlled by the server 56, but this may not be required.

The brand owner may issue his own security tags 20' which are then issued to trusted personnel, trusted places/positions or transceivers 30.

The scanning is as that described above but with the difference that the brand owner server 52/54 holds all information related to the verification/validation of the scanned tag(s) 20' without having to request information from the server 56.

In this manner, the brand owner may control the flow of goods within his premises in the same manner as the goods may be controlled world-wide.

The invention claimed is:

1. A system for verifying a communication device, the system comprising:

at least one communication device comprising:
a transmitter for wirelessly performing RFID, UHFRFID or LFRFID communication with a communication element, and
a storage for holding first information, the first information comprising ID information of the communication device,
at least one security communication device comprising:
a transmitter for wirelessly performing communication with the communication element, and
a storage for holding second information, the second information comprising ID information of the security communication device,
a verification element, and
the communication element being configured to:
wirelessly receive the ID information from one or more of the communication devices and one or more of the security communication devices,
transmit the received ID information to the verification element,
wherein the verification element is adapted to verify each of the one or more communication devices only if the received ID information of the pertaining communication device can be verified and the received ID information of at least one of the one or more security communication devices can be verified.

2. The system according to claim 1, wherein the verification element comprises a first and a second verification unit wherein:
the first verification unit comprises security verification information relating to ID information of verifiable or verified security communication devices, the first verification unit being adapted to output at least part of the verification information to the second verification unit, and
the second verification unit comprises information relating to ID information of verifiable or verified communication devices, the second verification unit being adapted to:
receive the at least part of the verification information,
receive the ID information from the communication element,
compare the received security ID information to the at least part of the verification information and the received ID information to the information and output, on the basis of the comparison, information relating to whether the communication device is verified or not.

3. The system according to claim 2, wherein at least one of the security communication devices is adapted to receive and store new security ID information.

4. The system according to claim 2, wherein:
the first verification unit is adapted to output to the second verification unit new security ID information, and
the second verification unit is adapted to store the new security ID information and output the new security ID information to the one of the security communication devices.

5. The system according to claim 4, wherein:
the security ID information and the new security ID information of the pertaining security communication device both comprises a first part and a second part, the first part of the security ID information and the first part of the new security ID information being identical, and the second part of the security ID information and the second part of the new security ID information being different, the second verification unit is adapted to compare, when having received the security ID information from the one of the security communication devices, the second part of the received security ID information with a corresponding part of the received at least part of the verification information and, if no correspondence is determined, request, prior to the comparing step, updated verification information from the first verification unit.

6. The system according to claim 2, wherein the first verification unit is adapted to compare an identity of the second verification unit to a list of recognized second verification units and output the at least part of the verification information only if the second verification unit is represented on the list.

7. A method of verifying a communication device, the method comprising the steps of:
at least one communication device wirelessly transmitting, as RFID, UHFRFID or LFRFID communication, ID information of the communication device to a communication element,
at least one security communication device wirelessly transmitting security ID information of the security communication device to the communication element,
the communication element wirelessly receiving the ID information from one or more of the communication devices and the security ID information from one or more of the security communication devices, and transmitting the received ID information and security ID information to a verification element,
the verification element verifying each of the one or more communication devices only if the received ID information of the pertaining communication device can be verified and the received security ID information of at least one of the one or more security communication devices can be verified.

8. The method according to claim 7, further comprising the steps of, pursuant to the verification step:
transmitting new security ID information to the security communication device and storing the new security ID information in the security communication device.

9. The method according to claim 7, wherein the verification element comprises a first and a second verification unit wherein:
the first verification unit holds verification information for verifying security communication devices and outputs at least part of the verification information to the second verification unit, and
the second verification unit:
holds information for verifying communication devices,
receives the at least part of the verification information,
receives the ID information from the communication element,
receives the security ID information from the security communication element and
compares the received security ID information to the at least part of the verification information and the received ID information to the information and outputs, on the basis of the comparison, information relating to whether the communication device is verified or not.

10. The method according to claim 9, further comprising the steps of:
the first verification unit outputting to the second verification unit new security ID information,
the second verification unit storing the new security ID information and outputting the new security ID information to the one of the security communication devices.

11. The method according to claim 10, wherein:
the security ID information and the new security ID information both comprises a first part and a second part, the first part of the security ID information and the first part of the new security ID information being identical, and the second part of the security ID information and the second part of the new security ID information being different,
the second verification unit comparing, when having received the security ID information from the one of the security communication devices, the second part of the received security ID information with a corresponding part of the verification information and, it no correspondence is determined, requesting, prior to the comparing step, updated verification information from the first verification unit.

12. The method according to claim 9, wherein the step of the first verification unit outputting the at least part of the verification information comprises the first verification unit comparing an identity of the second verification unit to a list of recognized second verification units and outputting the verification information only if the second verification unit is represented on the list.

13. The system according to claim 1, wherein the communication element is an RFID scanner and wherein the transmitter of the security communication device(s) are adapted to perform RFID, UHFRFID or LFRFID communication.

14. The method according to claim 7, wherein the transmitting step of transmitting the security ID information comprises performing RFID, UHFRFID or LFRFID communication.

15. A system for verifying a communication device, the system comprising:
at least one communication device comprising:
a transmitter for performing communication, and
a storage for holding first information, the first information comprising ID information of the communication device,
at least one security communication device comprising:
a transmitter for performing communication, and
a storage for holding second information, the second information comprising ID information of the security communication device,
a verification element, and
a communication element for:
receiving the ID information from one or more of the communication devices and one or more of the security communication devices,
transmitting the received ID information to the verification element,
wherein:
the verification element is adapted to verify each of the one or more communication devices only if the received ID information of the pertaining communication device can be verified and the received ID information of at least one of the one or more security communication devices can be verified
the verification element further is adapted to output new security ID information to at least one of the security communication devices, wherein the security ID information and the new security ID information of the pertaining security communication device both comprises a first part and a second part, the second part of the security ID information and the second part of the new security ID information being different, and
the at least one of the security communication devices is adapted to receive and store the new security ID information.

16. The system according to claim 15, wherein the verification element comprises a first and a second verification unit wherein:
the first verification unit comprises security verification information relating to ID information of verifiable or verified security communication devices, the first verification unit being adapted to output at least part of the verification information to the second verification unit, the first verification unit being adapted to output to the second verification unit the new security ID information and
the second verification unit comprises information relating to ID information of verifiable or verified communication devices, the second verification unit bring adapted to:
receive the at least part of the verification information,
receive the ID information from the communication element,
compare the received security ID information to the at least part of the verification information and the received ID information to the information and output, on the basis of the comparison, information relating to whether the communication device is verified or not,
store the new security ID information and output the new security ID information to the one or more of the security communication devices.

17. The system according to claim 16, wherein the second verification unit is adapted to compare, when having received the security ID information from the one of the security communication devices, the second part of the received security ID information with a corresponding part of the received at least part of the verification information and, if no correspondence is determined, request, prior to the comparing step, updated verification information from the first verification unit.

18. The system according to claim 15, wherein the verification element is adapted to output the new security ID information where the first part of the security ID information and the first part of the new security ID information are identical.

19. The system according to claim 15, wherein the verification element is adapted to store both the second part of the new security ID information and the second part of the security ID information.

20. The system according to claim 19, wherein the verification element is adapted to verify a security communication device, if the second part of the received ID information therefrom is stored in the verification element.

* * * * *